US005251191A

United States Patent [19]

Sturzl et al.

[11] Patent Number: 5,251,191

[45] Date of Patent: Oct. 5, 1993

[54] REMOTELY-SYNCHRONIZABLE TIME DISPLAY

[75] Inventors: Wilhelm Sturzl, Winkelhaid, Fed. Rep. of Germany; Bernard Schott, Strassburg, France

[73] Assignee: Diehl GmbH & Co., Fed. Rep. of Germany

[21] Appl. No.: 597,728

[22] Filed: Oct. 15, 1990

[30] Foreign Application Priority Data

Oct. 26, 1989 [DE] Fed. Rep. of Germany ... 8912675[U]

[51] Int. Cl.[5] ...................... G04C 9/02; H04M 11/00; G05D 27/02

[52] U.S. Cl. ................................ 368/47; 340/310 R; 364/492

[58] Field of Search ................ 368/46, 47, 52, 55–61; 340/310 R, 310 A; 364/492, 493

[56] References Cited

U.S. PATENT DOCUMENTS

| | | | |
|---|---|---|---|
| 3,541,552 | 11/1970 | Carlson | 368/47 |
| 3,811,265 | 5/1974 | Cater | 368/47 |
| 3,881,310 | 5/1975 | Gerum et al. | 368/47 |
| 4,204,398 | 5/1980 | Lemelson | 368/47 |
| 4,602,340 | 7/1986 | Appleberg | 364/492 |
| 4,650,344 | 3/1987 | Allgaier et al. | 368/47 |
| 4,886,981 | 12/1989 | Lentini et al. | 307/87 |

FOREIGN PATENT DOCUMENTS

| | | |
|---|---|---|
| 0062218 | 10/1982 | European Pat. Off. . |
| 3541651 | 6/1987 | Fed. Rep. of Germany . |

OTHER PUBLICATIONS

Funkschau Feb. 1982, p. 112.

*Primary Examiner*—Vit W. Miska

*Attorney, Agent, or Firm*—Scully, Scott, Murphy & Presser

[57] ABSTRACT

A time display which is remotely-synchronizable, especially a time display including timer switching zones or paths for the control of an electrical load or appliance. The time is equipped with a display receiver for the carrier frequency-converted absolute-coded time informations which are receivable through local transmitting intervals for the correction of the time display which is autonomously operated in an evaluating or sample-and-hold.

4 Claims, 1 Drawing Sheet

REMOTELY-SYNCHRONIZABLE TIME DISPLAY

BACKGROUND OF THE INVENTION

The present invention relates to a time display which is remotely-synchronizable, especially a time display including timer switching paths or zones for the control of an electrical load or appliance.

Discussion of the Prior Art

A time display of this type has already become known from the disclosure of U.S. Pat. No. 3,881,310, which is assigned to the common assignee of the present patent application, and is essentially a timepiece or clocks which is wirelessly synchronizable through the intermediary of a low-frequencied alternating-current power supply, in particular such as the electrical household power supply, wherein the alternating-current frequency is increased and transmitted as an alternating field to a receiver, which delivers an applicable pulse sequence for the continuing advance of the time display. When this time advancing pulse sequence is at any one time subjected to a power outage, or excessively deviates from a specified rated or reference pulse sequence-frequency, the advance for the display is then switched over to an internal pulse generator. The resultingly produced incorrect display, hereby caused by the erroneous advancing-frequency of the wirelessly transmitted pulses, in any case, can neither be determined as to the magnitude thereof nor corrected.

A momentary incorrect showing of the time display (such as having been caused by malfunctions of the apparatus or as a result of a just currently effected change from summer to winter time, in essence, from daylight savings to standard time) can only be determined and corrected in comparison with an absolute time information, such as is generally delivered by the long-wave transmitter DCF 77 as coded information with regard to the actual hour and minute for the actual date, whereby there is obtainable an information as to the seconds from the periodicity of the carrier-frequency amplitude modulation, for the binary coding of the absolute time information; such as is generally described in more specific detail in the disclosure of U.S. Pat. No. 4,650,344 with regard to a so-called autonomous radio clock. In that instance, there is also made reference to the problem which is encountered in that at the locale for positioning such a radio clock, there are no longer provided any adequate long-wave receiving capabilities which would be necessary. This is especially the case when the radio-correctable time display should be operated within interiorly-located or subterranean installation spaces or chambers in buildings constructed from steel-concrete structures, such as in the case of the preferred embodiment of the timer which is considered herein, and which is intended to be ordinarily installed in the region of the supply of electrical power to the household and energy distribution for the power rate-dependent control over the load, or in a heating cellar for the time-of-day dependent supply of hot water. Hereby, this can pertain to an electromechanical or to an electronic timer; for example, such as is described in the disclosure of German Patent 35 41 651, or in the publication FUNKSCHAU 2/1982, page 112.

SUMMARY OF THE INVENTION

Accordingly, in recognition of these conditions which are currently being encountered in the state-of-the-art, it is an object of the present invention to equip a time display of this type (which within the scope of the present specification is to be understood from the standpoint of apparatus but not limited to the represented shape) in such a manner, as to also enable it to be operated at a locale which is ordinarily inexpedient for the receipt of time transmissions and thereby; for example, to still be able to periodically test and when necessary correct this transmission in accordance with the measure of the absolute time informations which are transmitted over the radio.

The foregoing object is, in essence, inventively achieved in that the time display of the type which is under consideration herein is equipped with a display receiver for the carrier frequency-converted absolute-coded time informations which are receivable through local transmitting intervals for the correction of the time display which is autonomously operated in an evaluating or sample-and-hold.

In accordance with the foregoing object, an evaluating or sample-and-hold circuit which is equipped with the time display, and upon occasion, with a load circuit-switching section or interval which is controllable therefrom, does not directly receive the absolute time information which is as a rule, long-wave amplitude-modulated absolute time information from the time transmitter which, under circumstances, may be extremely far distant; but its display-receiver is supplied with a frequency-converted absolute time information by means of a local transmitting path, which is transmitted from a local converter-receiver equipped with a frequency transducer, through the household power supply or through a short-wave radio path to the display-receiver. Thus, it is merely necessary to arrange a converter-receiver with a long-wave antenna in a radio-technologically expedient position; for instance, beneath the roof of a building, so as to be able from there, and preferably through the energy supply network for the building, transmit the carrier frequency-converted absolute time information to suitable evaluating points, also to those in rooms or spaces which are inaccessible technologically to radio transmissions. Hereby, a correlated coupling stage can presently be so configured between the household power supply and the converter-receiver, of respectively, between the household power supply and the display-receivers, so as to be directly integrateable into the power supply connection for the operation of the converter-receiver or, respectively, for the operation of the timers or time switches. When, in contrast therewith, there is carried out a transmission of the absolute time information through the intermediary of a short-wave channel, then evaluating circuits outside of the building and which are equipped with suitable antennas, to whom the energy supply network is not available, can also be supplied with the absolute time informations.

BRIEF DESCRIPTION OF THE DRAWINGS

Additional alternatives and modifications, as well as further features and advantages of the invention can now be more readily ascertained from the following detailed description of exemplary embodiments thereof, taken in conjunction with the accompanying drawings; in which.

DETAILED DESCRIPTION

Figure 1:
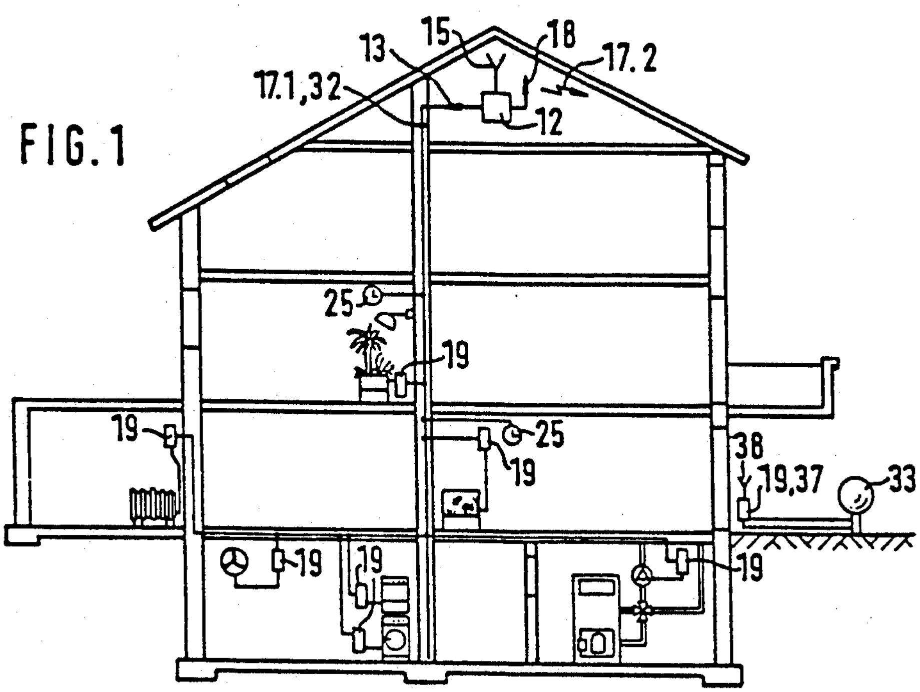
FIG. 1 illustrates in an essentially symbolic representation, a distribution within a house of an absolute time information obtained from a central converter-receiver.

The timing or clock system which is illustrated in the drawing, discloses a converter 12 which is installed in a building 11 at a location possessing good radio receiving conditions; for example, such as beneath the roof line or in the attic, for an absolute coded time information 13. Arranged therein is a receiver 14 which is permanently correlated with a time transmitter, wherein the receiver includes (for example, a ferrite) long-wave antenna 15, which preferably possesses an approximately panoramic receiving characteristic, so that it need not be particularly oriented in accordance with the relative transmitting location; for instance, such as is more closely described in European Laid-Open Patent Appln. 242 717. This converter receiver 14; however, is constantly set to receiving, or in any event, periodically over substantially lengthier periods of time, than is the display-receiver 20 which is supplied therefrom, as is described in further detail hereinbelow.

At least one frequency converter or transducer 16 is connected to an output of the converter-receiver 14, if required through amplifiers, in order for the local transmission of the received coded time information 13 to convert the later into another and preferably higher frequency range; whereby, in order to avoid interferences, the local transmission frequency F is not a whole-numbered or integral multiple of the carrier frequency F of the time transmitter. Serving as the local transmitting path 17, in accordance with the selected transmission frequency F, is preferably the high-voltage current-power supply network 17.1 which is in any event already available in the building 11; or instead thereof, or in parallel therewith there is provided a frequency converter or transducer 16 for the supplying of a local transmitting antenna 18, so that the transmitting path 17 is a radio transmitting path 17.2 for a frequency band which has been freed for that type of local service below the UKW-radio transmitting frequencies.

The transmission path 17 thus carries, on a higher frequencied carrier, the same amplitude-modulated time information 13 as is received by means of the long-wave antenna 15. This carrier frequency converted time information 13 is assumed in sample-and-hold or evaluating stations 19 through presently a display-receiver 20 which is permanently correlated, in accordance with the measure of the selected transmission path 17, with the transmission frequency; for example, of 120 kHz or, respectively, 40.7 MHz, for enabling the control of an evaluating circuit 21.

Within the last-mentioned circuit, a demodulator 22 delivers the actual received time information 13 to a comparator 23 which, on the other side, is supplied with the momentary display information 24 in accordance with the measure of the momentary setting of the time display 25 (such as the clock hands in front of the minute display on a clock dial face). When the time display 25 shows an incorrect or faulty display with regard to the absolute time information which is received over the radio, then the time display 25 is advanced for so long through a gate 26, until the display information 24 coincides with the actual absolute time information 13, and the comparator 23 or, in essence, the receiver-demodulator 20–22, is again deactivated until the subsequent testing point in time which is specified by the circuitry; as is described in more specific detail in U.S. Pat. No. 4,645,357. The time-maintaining operation of the time display 25 is effectuated from a time-maintaining circuit 27, preferably a quartz-stabilized oscillating circuit, which delivers the advancing pulses 28 to a switch mechanism 29. The last-mentioned, in the case of an electromechanical time display 25 (such as drop indicators, number rolls, or rotating displays) pertains to a step-by-step switch or stepping mechanism, or to a synchronous motor; and in contrast therewith, in the case of an optronic time display 25 relates to a display-segment control.

With respect to the evaluating circuit 21 with a time display 25 this can simply relate to a (display) clock or timepiece, as is illustrated in FIG. 1 at the ground level towards the right hand and the first floor towards the left hand through the representation of the clock symbol. However, relates to a timer whose switching time points are preselectable in a manner known per se through the intermediary of a manual control input 30. When the actual setting of the time display 25 corresponds to a preselected timepoint, a switching path 31, such as a high-voltage current contactor or relay, is either opened or closed for the operation of a load or appliance 33 which is supplied with energy from the power supply 32.

As in the case of the central local converter 12, there are preferably also operated the evaluating stations 19 from the power supply 32, inasmuch as the local transmission path 17 serves for the carrier-converted time information 13. Serving for the coupling and uncoupling of this information 13 is presently a coupling stage 34 with an oscillating circuit 35 which is correlated to the carrier frequency 17 at the output of the frequency converter 16, which is coupled by means of a transformer to an inductance 36 located at the output of the frequency converter 16 or, in essence, at the input of the control receiver 20.

At the locations of the installations of the evaluating stations 19 (should they be merely utilized as simple time displays 25 or possibly as timers, in essence, with time-controlled switching paths 31), at which the high-intensity power supply 32 for the building 11 is not longer available, or no longer available without any disturbances, then upon the equipping of the converter 12 with an transmitting antenna 18, a radio transmission path 17.2 serves for the transmission to autonomously insertable evaluating stations 19, which are ordinarily powered by batteries 37, and which are each equipped with a short-wave receiving antenna 28, such as in the instance of a battery-operated outside light 33, as shown towards the right in FIG. 1.

Figure 2:
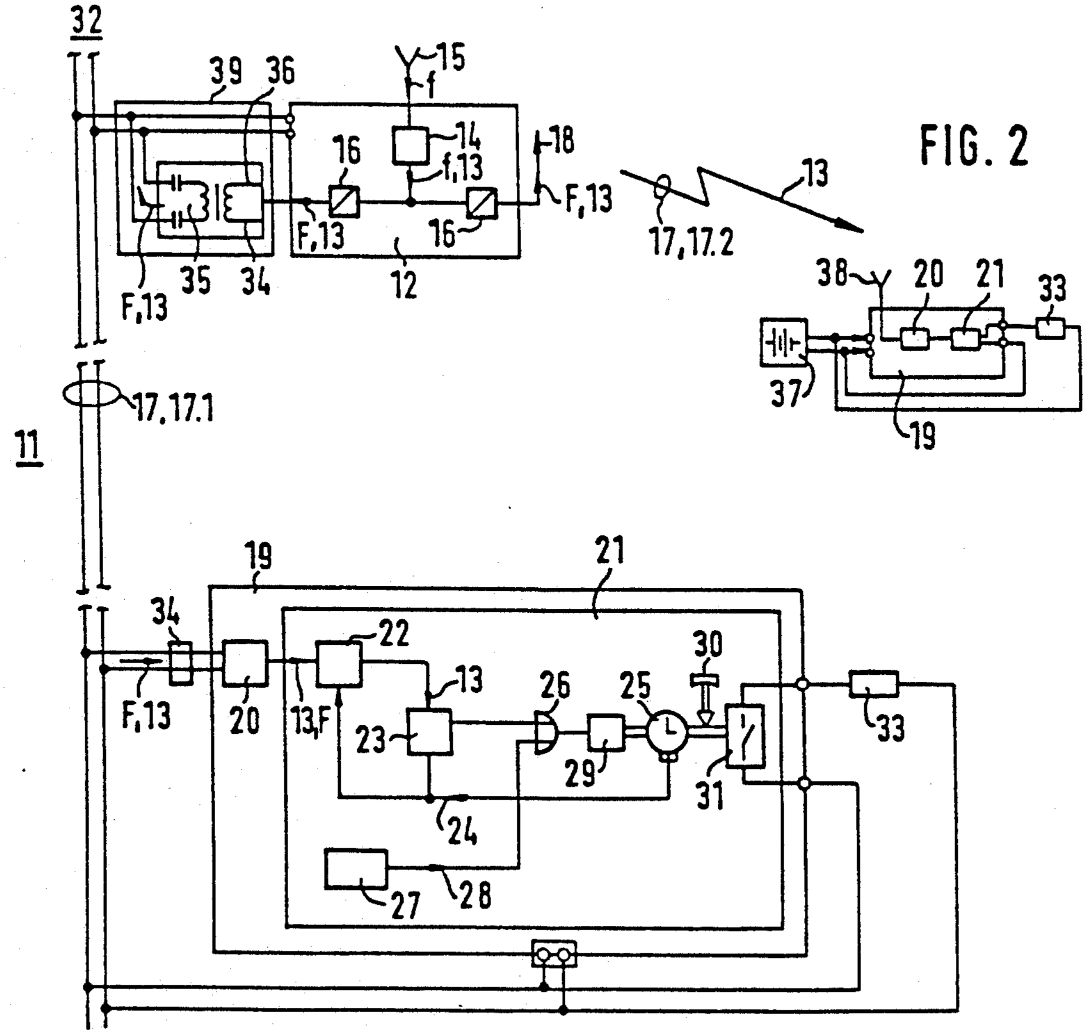
FIG. 2 illustrates a simplified block circuit diagram, showing the cooperation of the universally central converter-receiver with different evaluating stations.

In referring to the upper left portion of FIG. 2, it is considered that it is readily possible through suitable apparatus without anything further being required, to integrate the coupling stage 34 to or, respectively, from the energy supply for the household power 32 into a power supply connector 39 for the supplying of power to the converter-receiver 14 or, respectively, the display-receiver 20 which is connected to this household power supply 32.

However, when the local transmission path is disturbed or disrupted, then the display-receiver 20 cannot receive the absolute time information 13. Inasmuch as such local disturbances or interferences are, as a rule, only transient or temporary in nature, then the receiver 20 is again switched off and the time display 25 combined to be autonomously operated from its own time-maintaining circuit 27 until the periodic receiver-activation again once more produces utilizable informations 13 for a possibly required display correction.

What is claimed is:

1. An arrangement for transmitting encoded absolute time information to at least one evaluating station which is connected to a local AC power transmission network which supplies AC electrical power to the at least one evaluating station, comprising a central converter-receiver, including a receiver for receiving a carrier frequency encoded absolute time information signal, and a frequency converter connected to the output of said receiver for converting the frequency of the carrier frequency encoded absolute time information signal to a converted frequency to derive a converted frequency encoded absolute time information signal and for conducting the converted frequency encoded absolute time information signal into the local AC power transmission network which is connected between the frequency converter and the at least one evaluating station as a local transmission path for the converted frequency encoded absolute time information signal, and the at least one evaluating station includes an autonomously operated timer which is remotely-synchronizable by the converted frequency encoded absolute time information signal, a timer actuated switch for time controlled switching of electrical power to a load or appliance, a station receiver for receiving the converted frequency encoded absolute time information signal from the local AC power transmission network for correction of the absolute time of the autonomously operated timer, an input coupling stage for inductively coupling the station receive to the local AC power transmission network which includes a coupling transformer and an oscillating circuit, the frequency of which is correlated to the converted frequency, and the station input coupling stage is combined with an AC power supply connector for the station.

2. An arrangement as claimed in claim 1, wherein said frequency converter upconverts the frequency of the carrier frequency encoded absolute time information signal to a higher converted frequency signal.

3. An arrangement for transmitting encoded absolute time information to at least one evaluating station which is connected by a local transmission path, comprising a central converter-receiver, including a receiver for receiving a carrier frequency encoded absolute time information signal, and a frequency converter connected to the output of said receiver for converting the frequency of the carrier frequency encoded absolute time information signal to a converted frequency to derive a converted frequency encoded absolute time information signal, and a local transmitting antenna for transmitting locally the converted frequency encoded absolute time information signal, and the at least one evaluating station includes an autonomously operated timer which is remotely-synchronizable by the converted frequency encoded absolute time information signal, a timer actuated switch for time controlled switching of electrical power to a load or appliance, a station receiver including a local receiving antenna for receiving the converted frequency encoded absolute time information signal for correction of the absolute time of the autonomously operated timer.

4. An arrangement as claimed in claim 3, wherein said frequency converter upconverts the frequency of the carrier frequency encoded absolute time information signal to a higher converted frequency signal.

* * * * *